(12) United States Patent
Lempriere

(10) Patent No.: US 6,408,772 B1
(45) Date of Patent: Jun. 25, 2002

(54) IN-LINE SUB-SURFACE SEEDING, FERTILIZING AND WATERING SYSTEM

(76) Inventor: Noel D. Lempriere, Box 1178, Barriere (CA), V0E 1E0

( * ) Notice: Subject to any disclaimer, the term of this patent is extended or adjusted under 35 U.S.C. 154(b) by 0 days.

(21) Appl. No.: 09/959,682
(22) PCT Filed: May 5, 2000
(86) PCT No.: PCT/CA00/00517
§ 371 (c)(1), (2), (4) Date: Nov. 5, 2001
(87) PCT Pub. No.: WO00/67551
PCT Pub. Date: Nov. 16, 2000

Related U.S. Application Data

(60) Provisional application No. 60/132,734, filed on May 6, 1999.

(51) Int. Cl.[7] .............................. A01C 7/00; A01C 7/06
(52) U.S. Cl. .................. 111/123; 111/156; 111/927
(58) Field of Search .......................... 111/123, 120, 111/118, 200, 156, 927; 172/484, 500, 462

(56) References Cited

U.S. PATENT DOCUMENTS 4,762,075 A  8/1988  Halford
5,025,736 A  6/1991  Anderson

FOREIGN PATENT DOCUMENTS

DE  295 11 395 U1  1/1996
WO  WO 96/05717  2/1996

Primary Examiner—Christopher J. Novosad
(74) Attorney, Agent, or Firm—Anthony C. Edwards

(57) ABSTRACT

An in-line sub-surface seeding, fertilizing and watering system includes a blade (10) mountable into a header member (112) of a parallelogram linkage (110). A pair of parallel rigid drag arms (116, 118) extend between the header member (112) and a hanger member (114) and are pinned at their respective ends so that rotation of the header member relative to the hanger member on the parallel arms maintains a general horizontal orientation of the header member thereby supporting the blade (10) downwardly in a constant orientation. The hanger member is mountable to a supporting frame (182). A selective actuator such as a hydraulic actuator (138) or selectively controllable spring assembly (147) allows selective control of a downward force urging the blade into the soil. Where the selective actuator is a hydraulic actuator (138) mounted between the hanger member (114) or frame and the parallel arms (116, 118) or header member (112), the actuating linkage may be selectively elevated so as to remove the blade (10) from the soil.

24 Claims, 14 Drawing Sheets

IN-LINE SUB-SURFACE SEEDING, FERTILIZING AND WATERING SYSTEM

CROSS REFERENCE TO RELATED APPLICATION

This application claims priority from U.S. Provisional Patent application No. 60/132,734 filed May 6, 1999 entitled In-Line Sub-Surface Seeding, Fertilizing and Watering System.

FIELD OF THE INVENTION

This invention relates to the field of no-tillage opening blades which may be partially submerged into earth, for example in a farmers field, so as to pass the blade at a submerged depth for delivery of seeds, fertilizer or water into the earth, and to the mechanical system for actuating same.

BACKGROUND OF THE INVENTION

This invention relates to blade delivery systems which have replaced tillage plows and the like. It is known that the use of plows or other devices having for example tillage discs for tilling the earth or otherwise opening and turning a furrow through the ground suffer from the disadvantage that the moisture in the soil is unnecessarily exposed to evaporation. In the past it was necessary to open the earth so that the ground beneath the surface could be seeded, fertilized and watered. Whether this was accomplished by machinery or done manually, prior art machines or manual systems also suffered from the disadvantage that fertilizer was typically delivered into close proximity to the seeds being sown occasionally resulting in the seeds becoming chemically burnt.

Thus there exists a need for, and it is an object of the present invention to provide, a blade and actuating system wherein the blade may be partially submerged into earth and translated therethrough, where the blade disturbs the earth minimally and without tillage and is adapted to deliver one or all of seeds, fertilizer or water from the blade in advantageous spaced apart relation as hereinafter described.

SUMMARY OF THE INVENTION

The sub-surface seeding fertilizing and watering system of the present invention includes a mechanical actuating linkage for actuating an opening blade. The blade has first and second sides extending between a leading edge and an aft edge. The first and second sides are advantageously generally symmetrical to each other on either side of a first plane, where the first plane generally bisects the opening blade, and the leading edge and the aft edge lie generally in the first plane.

The opening blade has an upper surface and a lower surface extending between upper and lower edges respectively of the first and second sides of the blade. First and second wings are mounted to the first and second sides respectively in generally oppositely disposed relation so as to be cantilevered outwardly therefrom. The first and second wings extend between first and second forward wing edges and first and second aft-opening wing apertures in the first and second wings respectively. The first and second wings are mounted to the first and second sides at, respectively, first and second distances from the lower surface measured generally parallel to the first plane.

The opening blade has therethrough, and generally lying in the first plane, first and second conduits, extending from, and cooperating with, at uppermost ends thereof, first and second infeed ports in the upper surface. The first and second conduits cooperate with, at lowermost ends thereof, first and second wing ducts extending aft through the first and second wings respectively between the lowermost ends of the first and second conduits and the first and second aft opening wing apertures. The first and second conduits and the corresponding first and second wing ducts are thereby in material flow communication between the first and second infeed ports and the corresponding first and second aft opening wing apertures for seed, fertilizer or fluid flow, as fed from a material feeder, therethrough during the forward translation of the blade.

The opening blade is mountable to the material feeder so as to be generally vertically disposed, when mounted thereon for partial submerging into soil to a first submerged depth advancing the leading edge through the soil. The first and second distances are less than the first submerged depth so that the first and second wings are submerged in the soil during the forward translation of the blade.

In one preferred embodiment, the opening blade further includes a third conduit extending in material flow communication between a third infeed port in the upper surface and an aft opening blade aperture in a rearward position on the opening blade in proximity to the aft edge for seed, fertilizer or fluid flow therethrough, as fed from the material feeder. Advantageously the aft-opening blade aperture is centrally disposed relative to the first plane so as to lie generally symmetrically across the first plane, and may be positioned so that the aperture intersects the lower surface of the blade. Thus the aft-opening blade aperture is formed at the intersection of the lower surface and the aft edge of the blade. The aft-opening blade aperture may lie in a second plane at generally 30° inclined relative to a third plane generally containing the lower surface of the blade, wherein the third plane is generally orthogonal to the first plane.

Advantageously, the first, second and third conduits are generally parallel and raked aft of their corresponding first, second and third infeed ports. The first, second and third conduits may be raked aft at an angle of approximately 55° relative to a fourth plane generally containing the upper surface of the blade if the upper surface is a planar generally horizontal surface, although this is not necessarily so.

In one embodiment, but not so as to be limiting, at least the first and second conduits are formed by mating of corresponding opposed facing channels in oppositely mounted side panels, oppositely mounted in, or mountable into, first and second sides of the blade.

In a further aspect of the design, the third conduit is generally parallel and adjacent the aft edge and the leading edge is concavely curved and forms a pointed toe at the intersection of the leading edge and the lower surface of the blade. Advantageously, the pointed toe may be made of hardened material relative to the hardness of material forming the balance of the opening blade.

In a further aspect, the opening blade may be defined as having a longitudinal length dimension and a height dimension, where the longitudinal length dimension is perpendicular to the height dimension and both dimensions lie in the first plane. Further, the opening blade has a lateral width dimension perpendicular to the first plane.

The longitudinal length dimension extends between the leading and aft edges of the blade, the height dimension extends between the upper and lower surfaces of the blade, and the lateral width dimension extends between the first and second sides of the blade. In the present design, the length dimension is much, that is, significantly greater than the width dimension, as described hereinafter. The height dimension in one embodiment is greater than the submerged depth so that the blade is supported above the soil and the blade thus partially submerged during forward translation, although this is not intended to be limiting. That is, it is readily conceivable to mount the blade to a support that itself becomes partially submerged in the soil.

Further advantageously, the first and second wings are wedge-shaped and the forward wing edges are vertices of the wedge-shaped wings.

The sides of the blade may be thought of as having upper and lower portions respectively above and below the wings. Thus, the first and second sides have upper portions generally located, respectively, between the first and second wings and the upper surface of the blade, and lower portions generally located between, respectively, the first and second wings and the lower surface of the blade. The lower portions collectively form a waisted shape so that a forward width dimension of a forward flared portion of the lower portion of the opening blade and an aft width dimension of an aft flared portion of the lower portion of the opening blade, the forward and aft width dimensions extending between the lower portions of the first and second sides, are greater than an intermediate width dimension of a waisted portion longitudinally extending contiguously between the forward and aft flared portions.

The first wing may be defined as being set back a first longitudinal distance from the leading edge and the second wing as being set back a second longitudinal distance from the leading edge. Thus, in one aspect of this design, the first longitudinal distance may be greater than the second longitudinal distance. Correspondingly, the first wing mounted to the first side of the blade at a first longitudinal location generally corresponding to the aft flared portion of the blade, and the second wing may be mounted to the second side at a second longitudinal location generally corresponding to the waisted portion of the blade.

In the wing design, an upper wing surface on the first and second wings extends aft over the corresponding first and second aft-opening wing apertures on aft cantilevered upper wing members. The lower wing surface on the first and second wings may form a first wedge angle of approximately 5° with the upper wing surface. Further, laterally outer-most wing surfaces extend between the upper and lower wing surfaces. The laterally outer-most wing surfaces may advantageously intersect the corresponding first and second sides of the blade at their corresponding first and second forward wing edges. Thus the laterally outer-most wing surfaces may form a second wedge angle of approximately 5° relative to the first and second sides of the blade respectively. Advantageously, the first and second wings may themselves also be inclined downwardly so that a pair of corresponding planes bisecting the wedge angle between the upper and lower wing surfaces on each of the first and second wings, where the pair of corresponding planes contain the corresponding forward wing edges, are inclined forwardly and downwardly at approximately 5° relative to a generally horizontal plane containing the lower surface, it being taken for the sake of this defined relationship that the lower surface is generally planar and horizontal, although this is not intended to be limiting, and is not necessarily so, notwithstanding that the preferred embodiment hereinafter described is illustrated as such.

The blade is mountable into a header member of a parallelogram linkage. A pair of parallel rigid drag arms extend between the header member and a hanger member and are pinned at their respective ends so that rotation of the header member relative to the hanger member on the parallel arms maintains a general horizontal orientation of the header member thereby supporting the blade downwardly in a constant orientation. The hanger member is mountable to a supporting frame. Selective actuation means such as a hydraulic actuator or selectively controllable spring assembly allows selective control of a downward force urging the blade into the soil. Where the selective actuation means is a hydraulic actuator mounted between the hanger member or frame and the parallel drag arms or header member, the actuating linkage may be selectively elevated so as to remove the blade from the soil.

In a preferred embodiment, a swivel mounted coulter wheel is mounted to a forward end of the header member, ahead of the leading edge of the blade when the blade is mounted to an intermediate or rear end of the header member. In a further alternative embodiment, a furrow closing arm, which may be a leaf spring arm, is mounted to a rear end of the header member so as to trail rearwardly therefrom in line with a furrow created by the blade passing through the soil. The closing arm may be urged downwardly by a selectively adjustable downward biasing means such as a pivotally mounted rocker arm pivotally mounted to a rear end of the header member and selectively adjustable so as to be rotated downwardly into downward biasing engagement against the furrow closing arm.

DETAILED DESCRIPTION OF PREFERRED EMBODIMENTS

Figure 1:
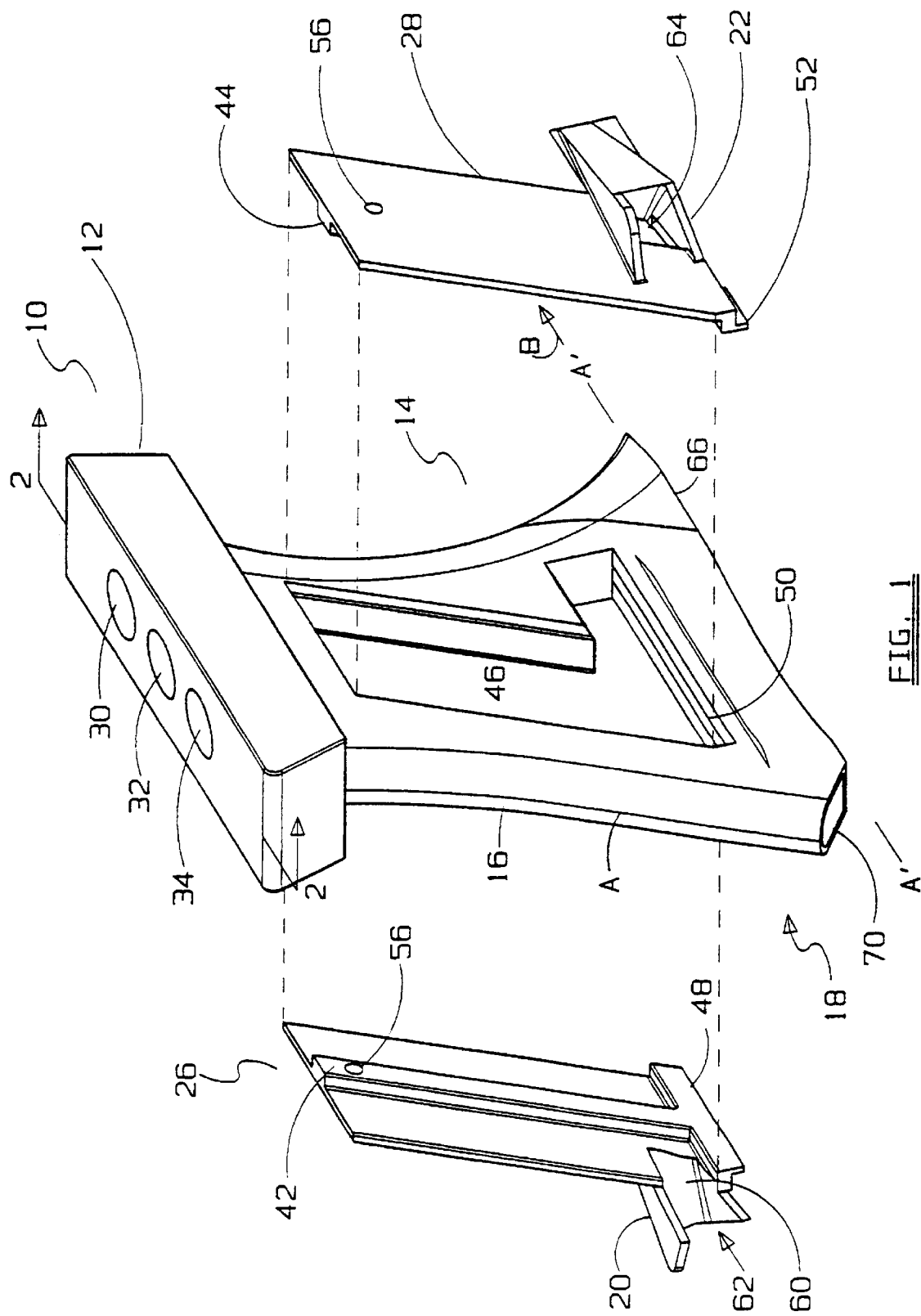
FIG. 1 is, in exploded perspective view, the inline, subsurface seeding, fertilizing and watering blade of the system of the present invention.

As may be seen in FIG. 1, the no-tillage in-line subsurface seeding, fertilizing and watering blade of the system of the present invention is depicted as opening blade 10. Opening blade 10 has an upper, ported, mounting block 12 rigidly mounted atop a generally planar blade structure 14. Blade structure 14 has a trunk 16 depending generally vertically beneath the upper ported mounting base or block 12. Formed as part of the lower end of trunk 16 is a foot structure generally indicated by numeral 18.

As also seen in FIGS. 2–5, mounting block 12 and blade 14, including trunk 16 and foot 18, are elongate in a generally vertical first plane A. The first plane includes longitudinal axis A'. With the exception of wings 20 and 22, as better described below, the outer surface of trunk 16 smoothly merges into, so as to truncate in cross-section as, a waisted or foot-shaped lower surface 24. In one embodiment access panels 26 and 28, which conformally mount onto the lateral side walls of trunk 16, are symmetrically shaped relative to the plane of symmetry of trunk 16. The plane of symmetry of trunk 16 coincides with the first plane.

Upper ported mounting block 12 has ports 30, 32 and 34 formed in its upper surface. The ports extend downwardly through block 12 in cooperative alignment with corresponding channels 36, 38 and 40 extending downwardly in generally parallel spaced apart array through trunk 16. Channel 40 also extends downwardly through foot 18.

Channels 36 and 38 may, in one preferred embodiment not intended to be limiting, be formed by the alignment and snug adjacency of flanges 42 and 44 on the inner sides of access panels 26 and 28 respectively when the access panels are mounted conformally in opposed relation, to the lateral sides of trunk 16 so as to cover cavity 46 in trunk 16. Access panel 26 may be mounted onto the port side of trunk 16 by means of tab 48 slidably engaging corresponding slot 50, formed in the lower surface defining cavity 46, so as to protrude downwardly into foot 18. In a similar fashion, tab 52 on access panel 28 also slidably engages slot 50 when mounting access panel 28 onto the starboard side of trunk 16. The upper ends of access panels 26 and 28 may be secured by releasable fasteners, for example a cooperating, flush-mounted nut and bolt pair (not shown) journalled through apertures 56.

With access panels 26 and 28 mounted onto trunk 16, so as to cooperatively align and abut flanges 42 and 44, thereby completing forming and separation of channels 36 and 38, channels 36 and 38 form a pair of chutes in cooperative alignment between ports 30 and 32 in mounting block 12 and corresponding lower outlet ports 58 and 60. Lower outlet ports 58 and 60 are directed laterally oppositely and open into the respective interior ducts 62 and 64 formed within respective wings 20 and 22. Interior ducts 62 and 64 open out into corresponding aft-facing apertures from under their respective wings 20 and 22 as better hereinafter described.

Toe 66, which may be of a different and hardened material relative to the material forming mounting block 12, trunk 16 and foot 18, is rigidly mounted, by bolting or other means known in the art, to the forward portion of foot 18 so as to form a forwardly extending point or snout 68, forwardly facing in the direction of forward translation B when the blade is translated in use. Advantageously, mounting block 12, trunk 16 and foot 18 may be made of austempered ductile iron (hereinafter ADI) and toe 66 may be made of a chrome alloy. Access panels 26 and 28 and wings 20 and 22 may also be made of ADI.

Channel 40 is formed within and alone the rear or aft edge of trunk 16 and foot 18 so as to form a continuous generally linear conduit between port 34 and rear aperture 70. Advantageously, the rear-most end of foot lower surface 24 is upturned for example as to provide aperture 70 with an opening generally perpendicular to the longitudinal axis of channel 40. Further advantageously, channels 36, 38 and 40 are generally parallel so as to be raked aft in a downward direction from ports 30, 32 and 34.

Figure 3:
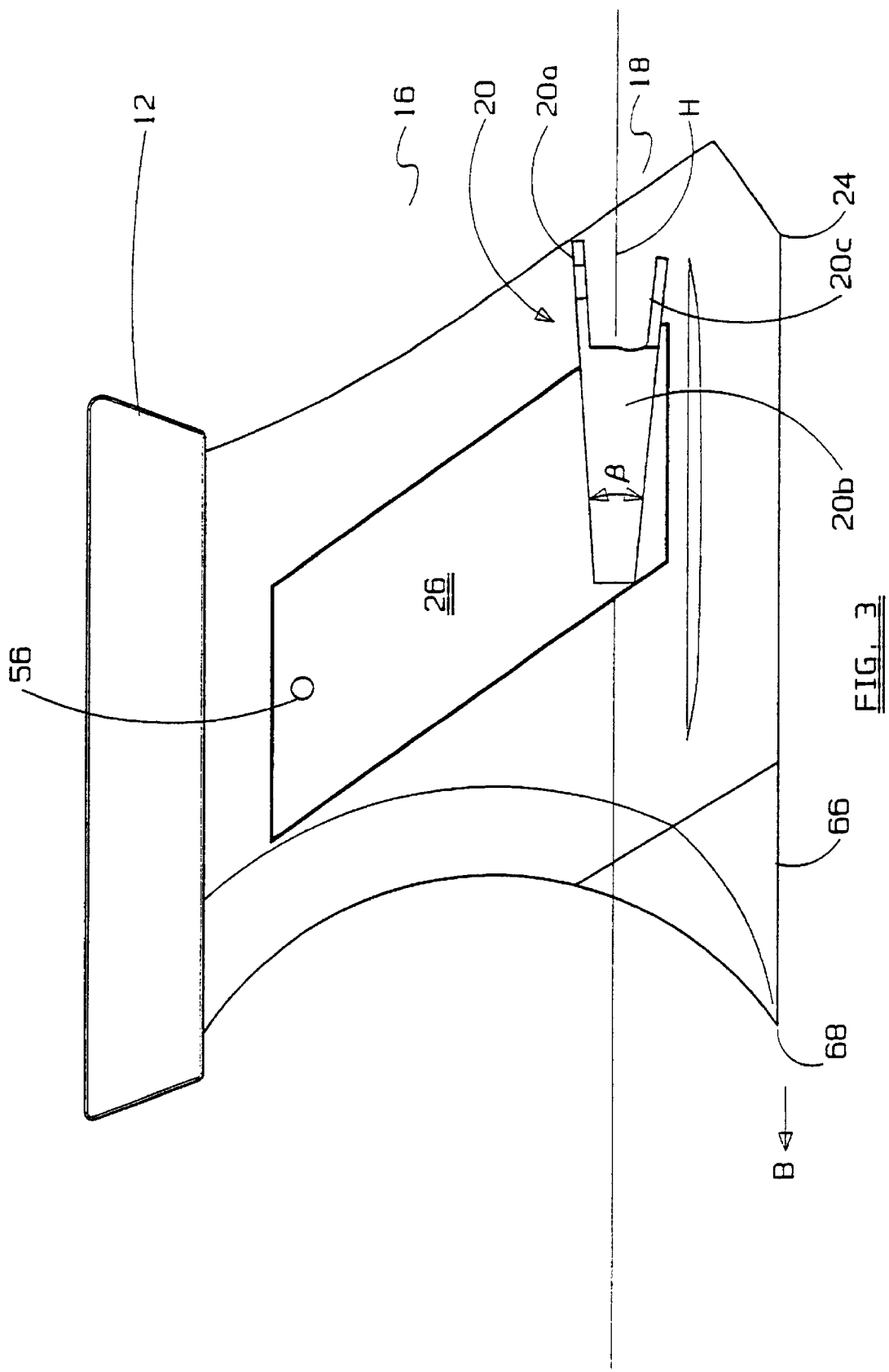
FIG. 3 is, in left side elevation view, the device of FIG. 1.
Figure 3A:
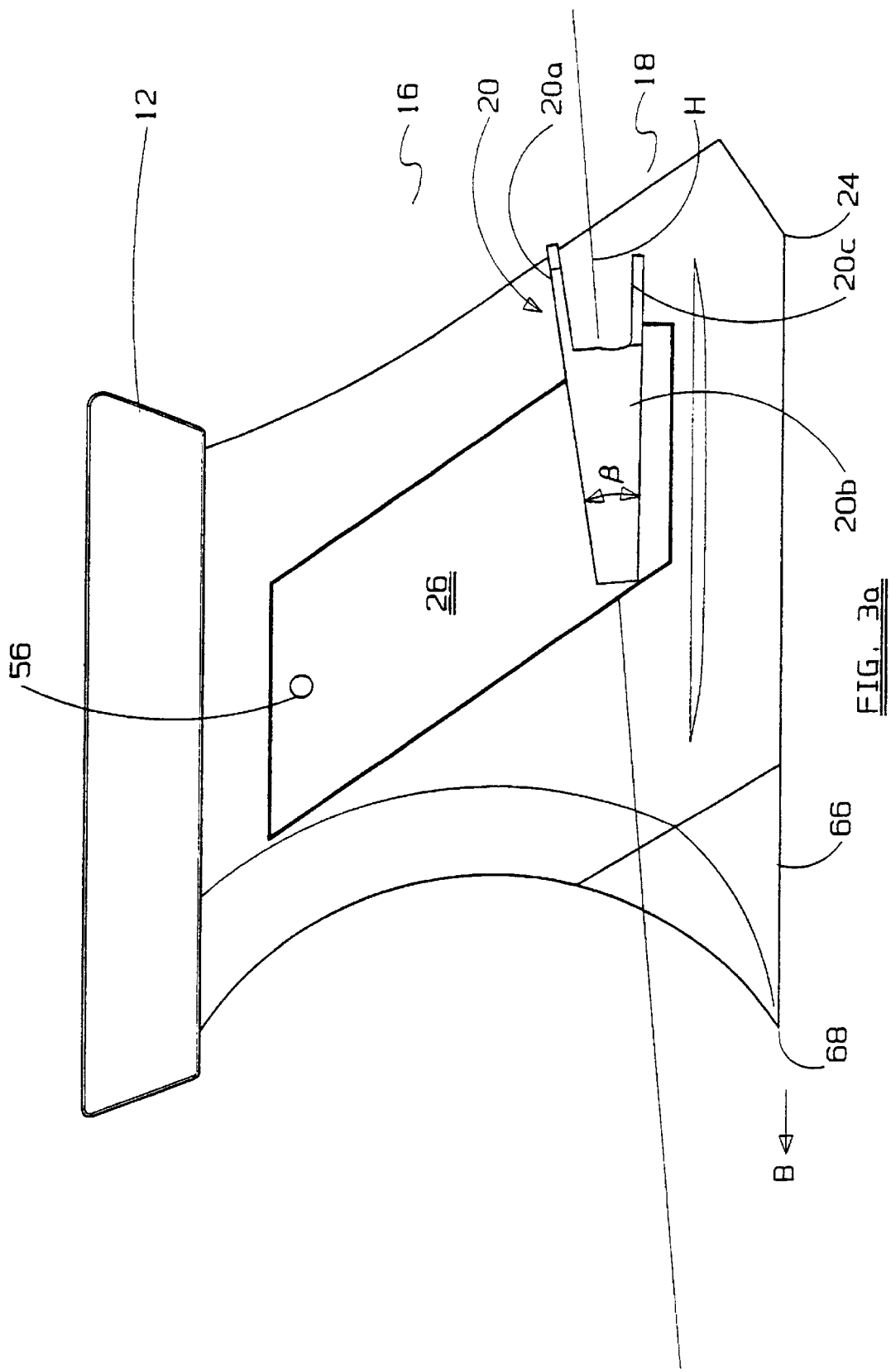
FIG. 3a is, in left side elevation view, an alternative embodiment of the device of FIG. 3.
Figure 4:
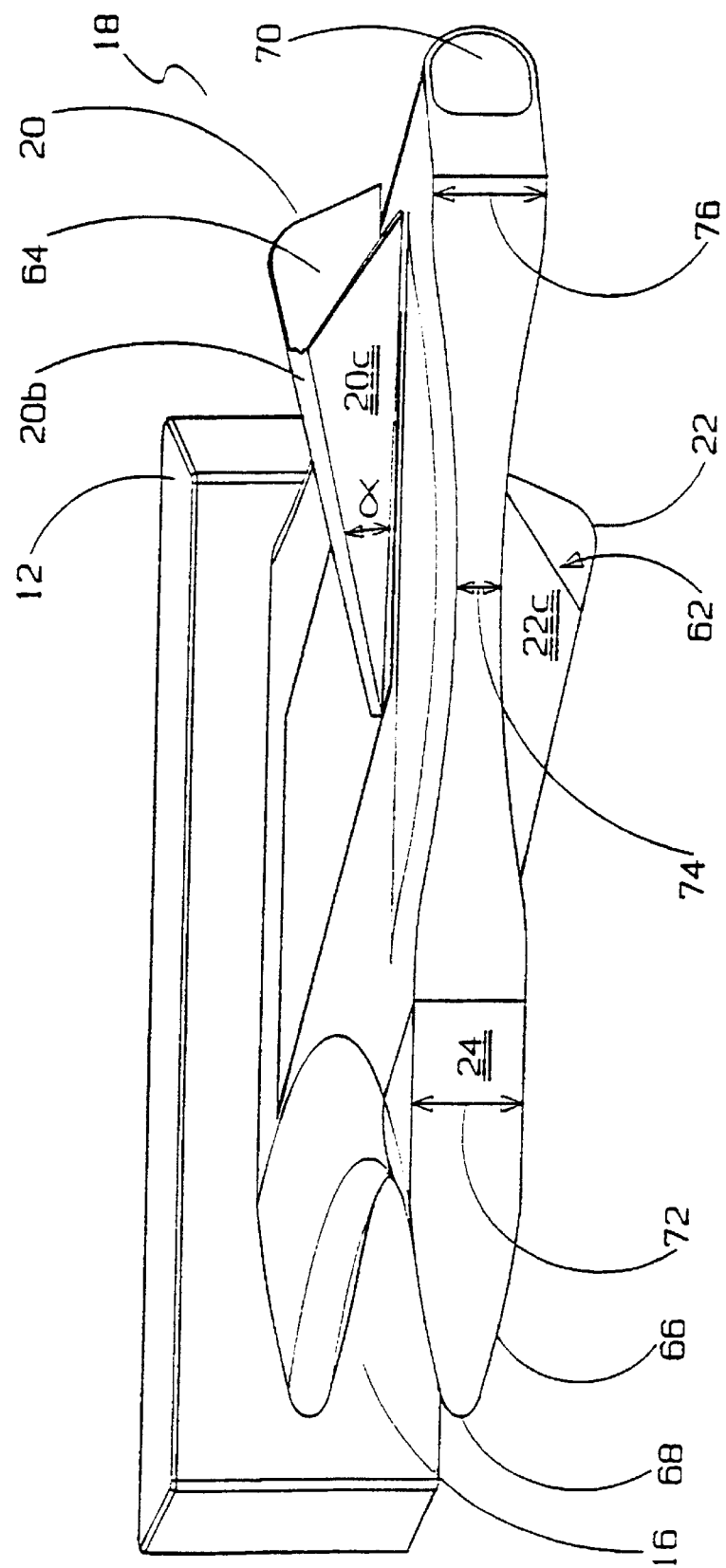
FIG. 4 is, in bottom perspective view, the device of FIG. 1.
Figure 5:
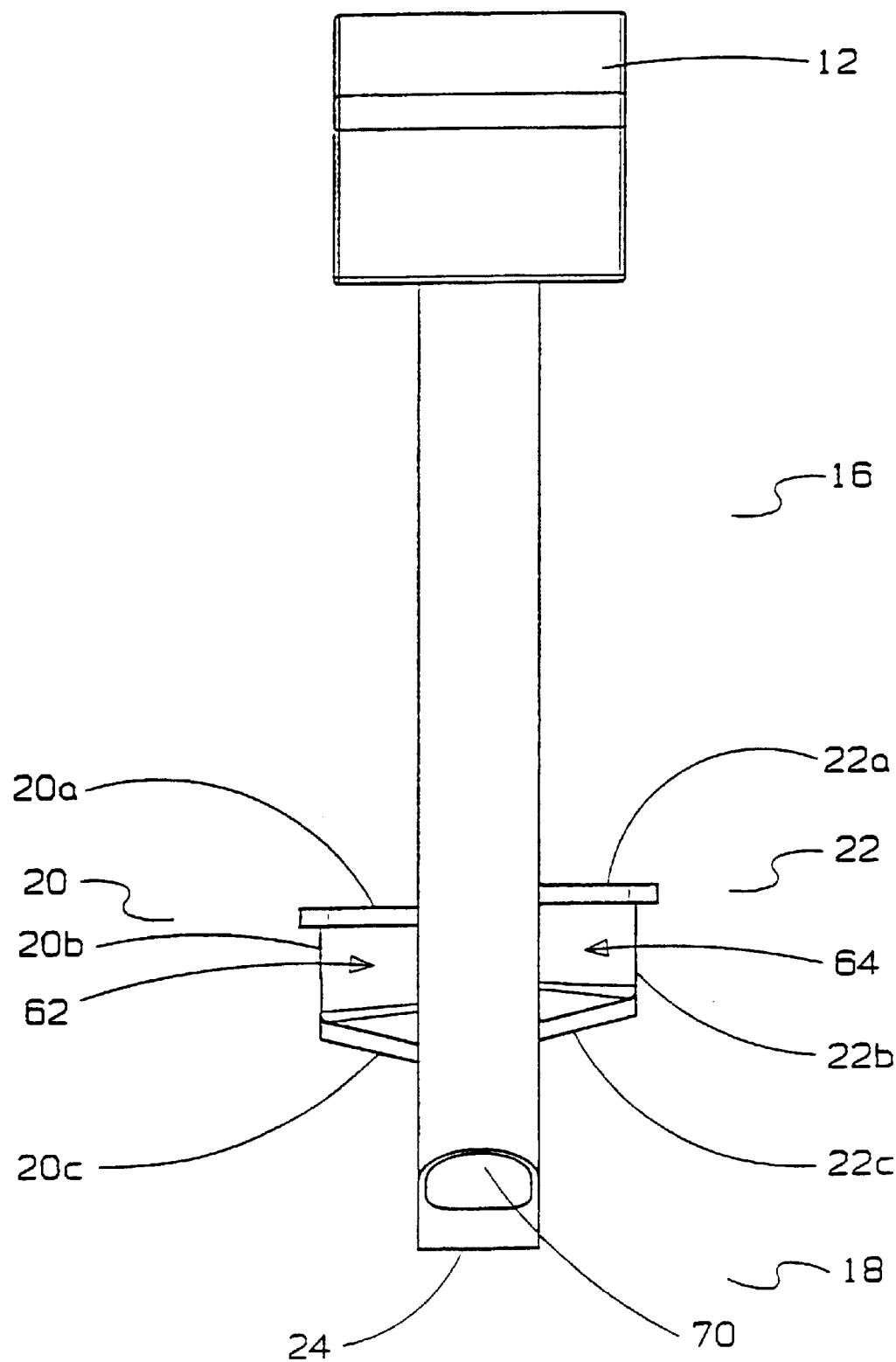
FIG. 5 is, in rear elevation view, the device of FIG. 1.

Wings 20 and 22 are each shaped as truncated wedges or otherwise as what may be described as irregular pyramid shapes wherein the vertex of each wedge or pyramid is aligned so as to be forward facing (in direction B) with the wedge diverging aft so as to form correspondingly shaped interior ducts 62 and 64 opening aft through the base of the wedges. In one preferred embodiment, the acute angles alpha ($\alpha$) and beta ($\beta$), formed at the vertex of the wedges forming wings 20 and 22, are each approximately 5 degrees. In the preferred embodiment upper surfaces 20a and 22a, lateral surfaces 20b and 22b, and lower surfaces 20c and 22c of wings 20 and 22 respectively are each generally planar. In one embodiment such as seen in FIG. 3a, upper surfaces 20a and 22a are inclined forwardly further downwardly relative to the plane containing foot lower surface 24, thus a plane II bisecting angle $\beta$ would in this embodiment advantageously form an angle of approximately 5° relative to the plane F containing lower foot surface 24.

Upper surfaces 20a and 22a extend aft and are cantilevered outwardly over the aft apertures of interior ducts 62 and 64. The aft apertures of interior ducts 62 and 64 are advantageously formed by reducing the longitudinal length of lateral side walls 20b and 22b and raking the rearmost edge of lower surfaces 20c and 22c so as to extend them contiguously aft from the rear edge of lateral side walls 20b and 22b respectively to blend with foot 18.

In the preferred embodiment, foot 18 is curvaceously waisted along its longitudinal length so as to form between curved side walls a forward expanded lateral dimension 72 smoothly tapering into a reduced lateral dimension 74 corresponding to the waisting and, progressing aft, a gentle flaring to an aft expanded lateral dimension 76. In the preferred embodiment the waist of foot 18 approximately corresponds, in the longitudinal direction of axis A', to the position of the forward ends of wings 20 and 22.

Figure 6:
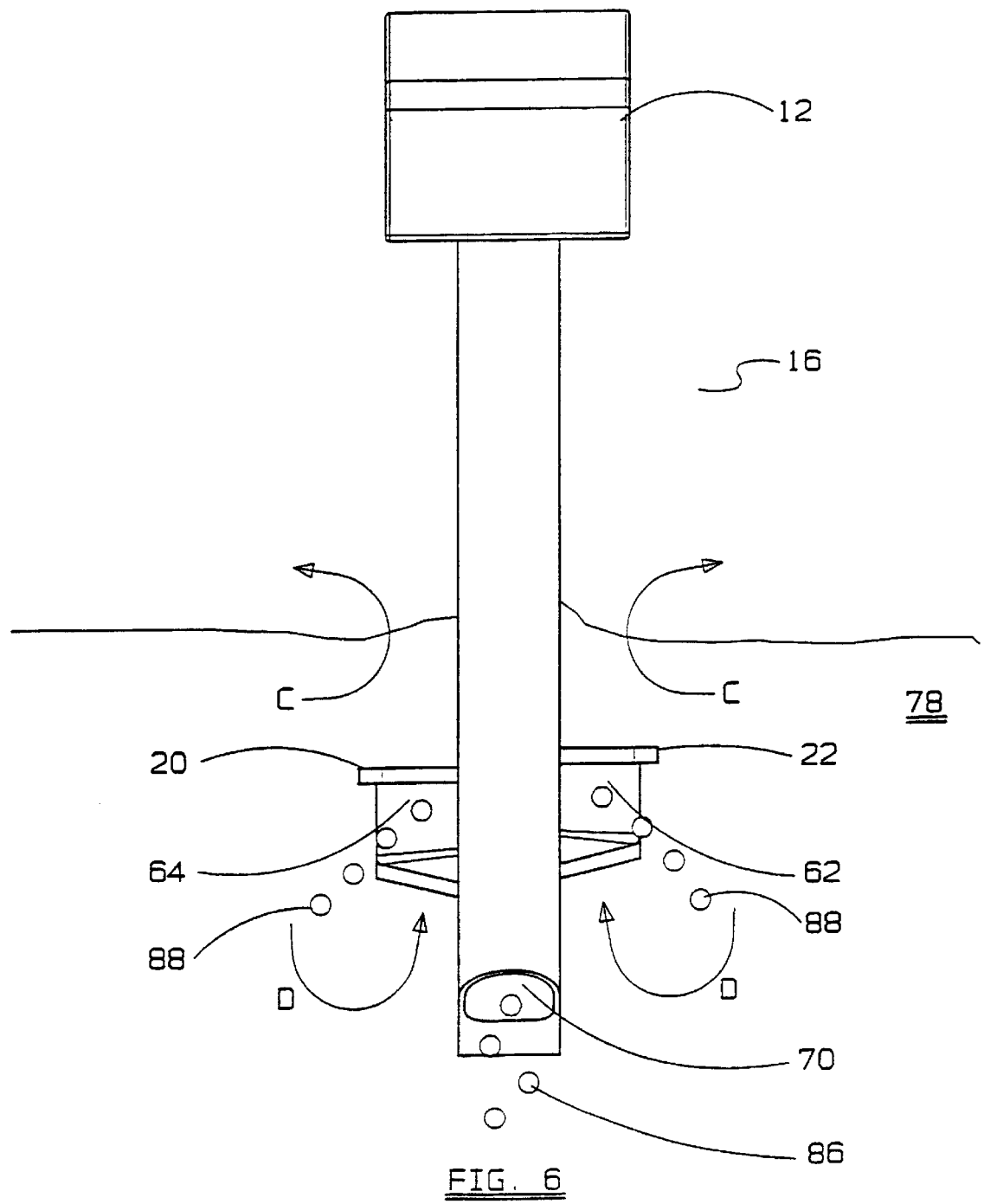
FIG. 6 is the view of FIG. 5 as the blade is passed through soil.

In use, blade 16 is translated in direction B through soil 78. As seen in FIG. 6, blade 16 is driven forwardly and positioned as better hereinafter described so as to maintain wings 20 and 22 submerged at a shallow depth below the surface of soil 78. Such motion opens the soil upwardly from point 68 on toe 66 upwardly along the leading edge of foot 18 and blade 16 causing a small lifting and separating of soil 78 in opposite directions C. As blade 16 translates through the soil, material fed into ports 30, 32 and 34 flows under the force of gravity through respective channels 36, 38 and 40. Material flowing through channel 40 exits through aperture 70 at the lowermost position of the narrow furrow 80 seen in FIG. 7 formed in soil 78 by the passing of blade 14 therethrough. The passing of wings 20 and 22 through soil 78 form shelves 82 in the soil as the soil is displaced by the wings so as to form shoulders 84 approximated in the illustration of FIG. 7.

The forward movement in direction B of blade 14 through soil 78 draws material such as fertilizer 86 from aperture 70, and also draws material such as seeds 88 from ducts 62 and 64 as the seeds are fed from channels 36 and 38 through outlet ports 58 and 60 respectively.

Figure 7:
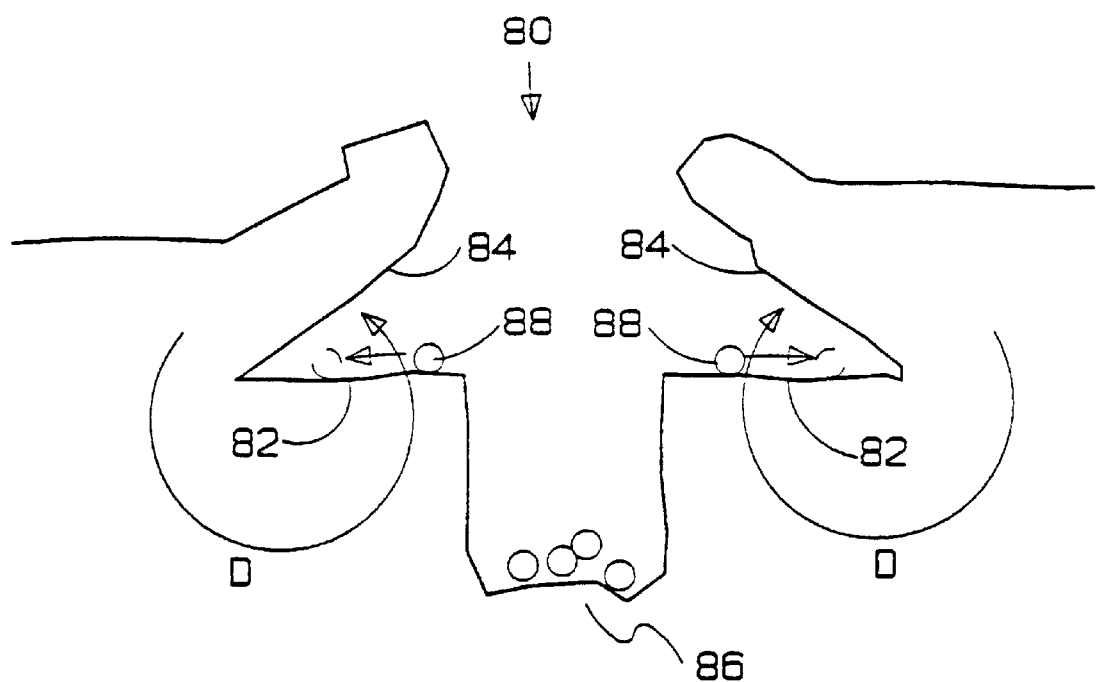
FIG. 7 is the rear elevation view of FIG. 6 with the blade removed for clarity so as to illustrate an approximation of the soil mechanics during an initial seed placing and fertilizing phase.
Figure 8:
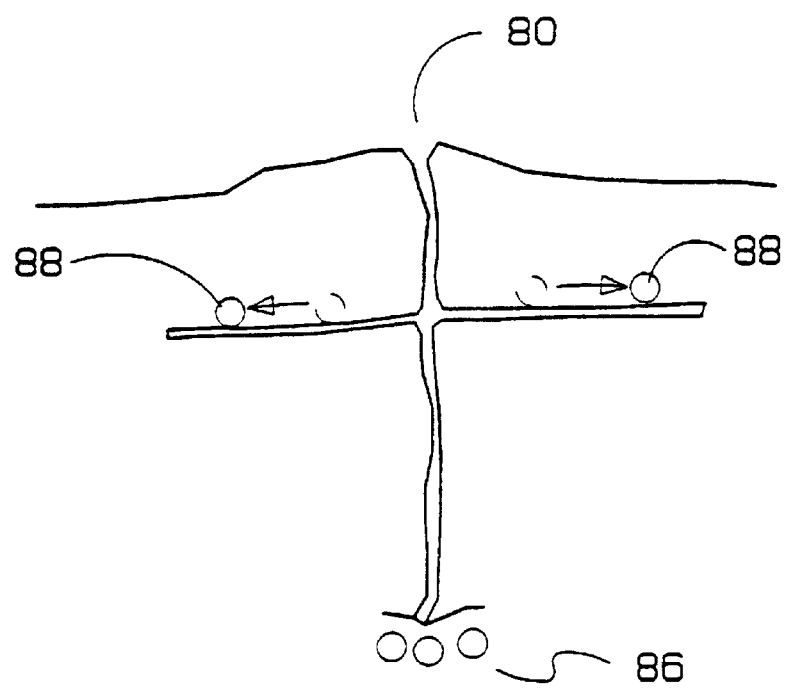
FIG. 8 follows on as a time-elapsed view of the view of FIG. 7, illustrating the collapse of the soil and lateral translation of the seeds following the initial phase.
Figure 9:
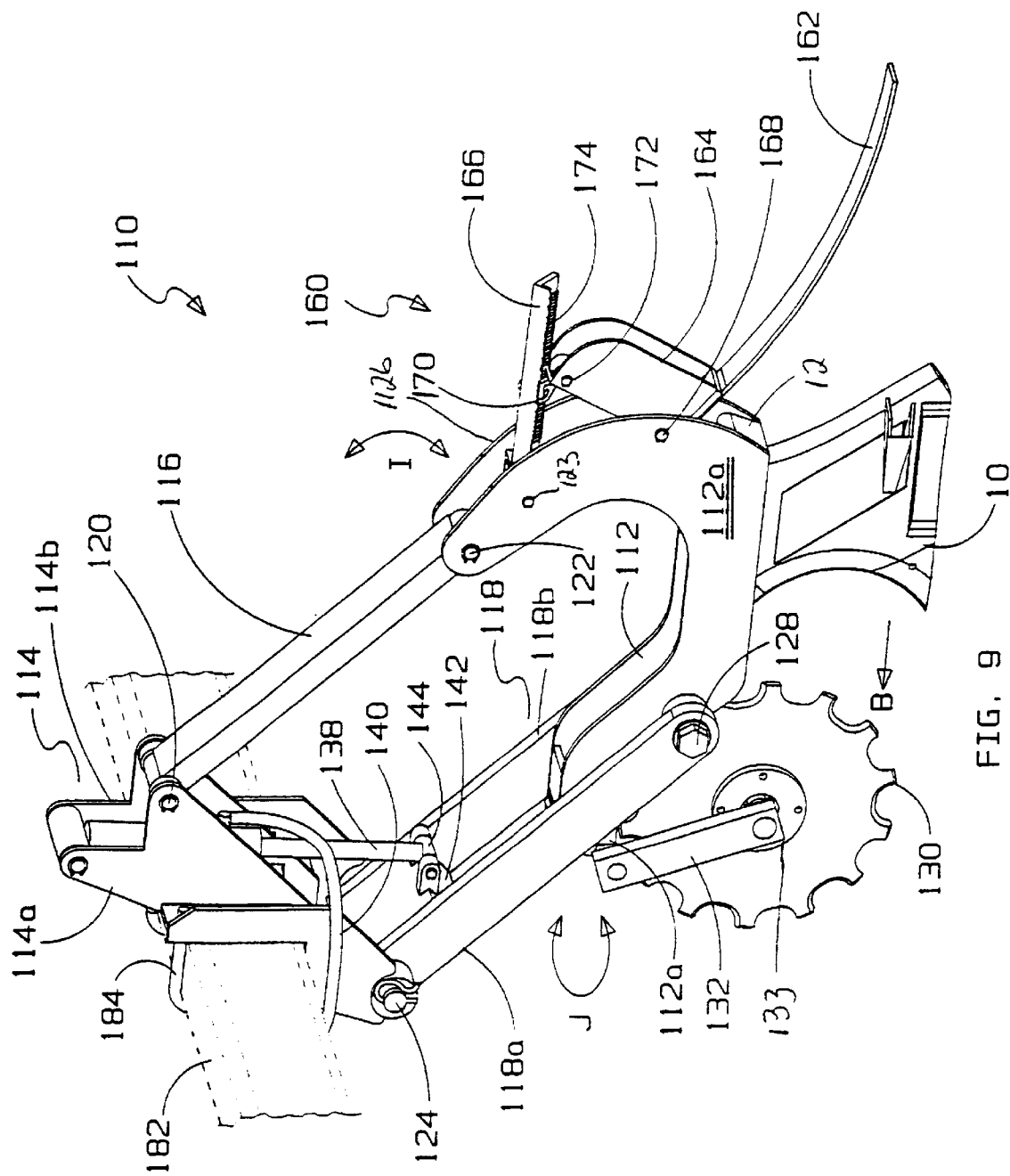
FIG. 9 is, in a generally side perspective view, the actuating linkage of the in-line sub-surface seeding, fertilizing and watering system of the present invention, with the actuating linkage in a lowered position.

It has been found that the passing of wings 20 and 22 and the passing of foot 18 in their form as described herein, causes a fluid-like circulation in direction D of soil 78 aft of wings 20 and 22. It is understood that the view of FIG. 7 is an approximation of the cross-section through the soil immediately behind blade 14 as it is translating through the soil. The soil, acting in a fluid manner, collapses so as to drop down shoulders 84 as the soil beneath shelves 82 is circulated in counter-rotation in direction D. Applicant has found that this circulation transports seeds 88 laterally outwardly along shelves 82 so as to facilitate advantageous lateral spacing apart of seeds on either side of furrow 80 separated both laterally and vertically from fertilizer 86 so as to inhibit chemical burning of the seeds for example by reason of the spacial relationship approximated by the illustration of FIG. 8.

It is understood that the order and type of materials introduced into ports 30, 32 and 34 may be changed as would be known to one skilled in the art so as to introduce, for example, seeds through ports 30 and 32 and water through port 34. A person skilled in the art would also understand that ports 30, 32 and 34 would have to be attached by appropriate conduits to corresponding hoppers or reservoirs carried, for example on a tractor (not shown).

Figure 2:
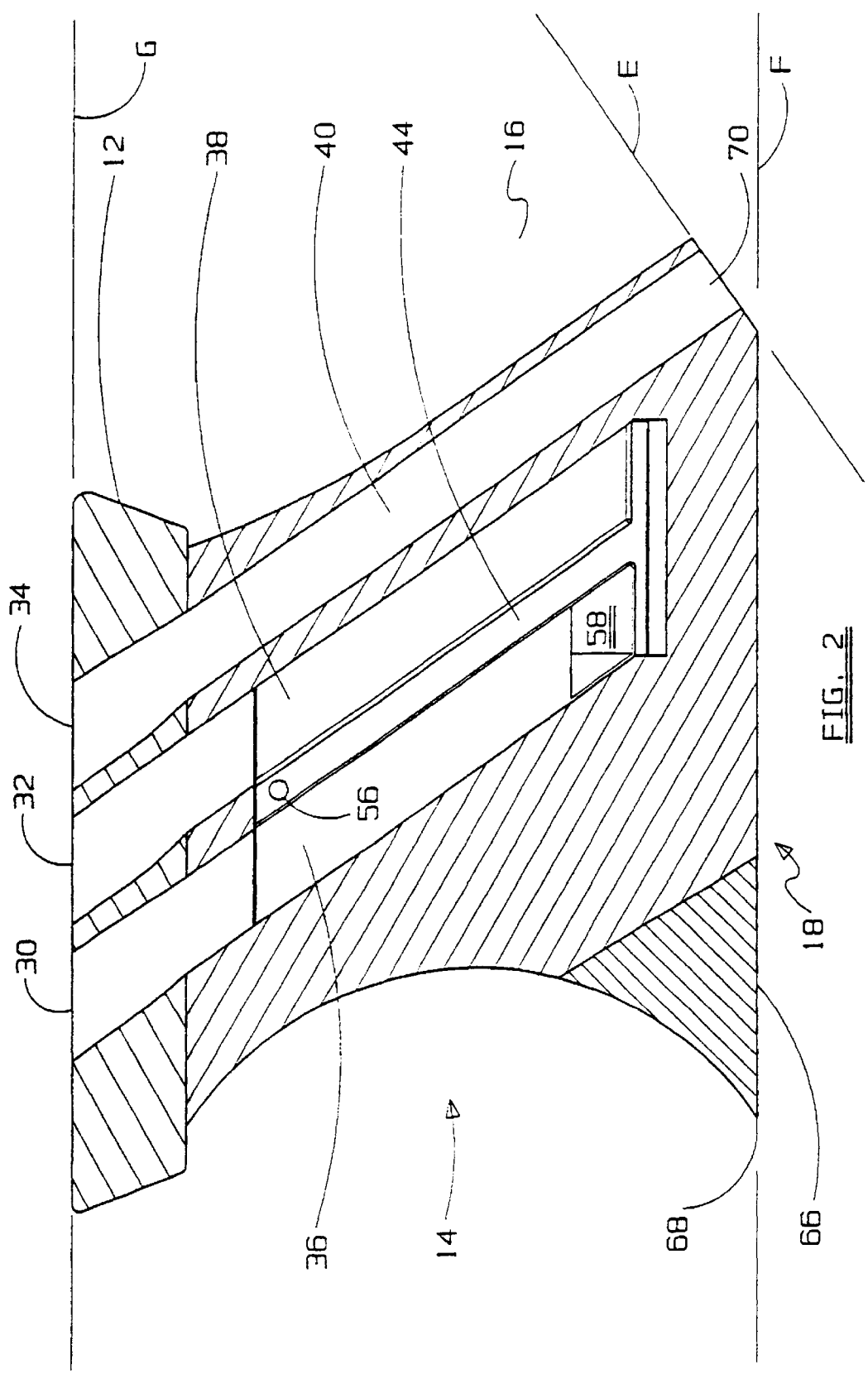
FIG. 2 is a cross-sectional view along line 2—2 in FIG. 1.

In the preferred embodiment, although not intended to be limiting, certain planes assist in defining the relationship of the elements of the present invention relative to one another as described above and claimed hereinbelow. Firstly, blade structure 14 is generally bisected by a first plane A, referred to above as coinciding with the plane of symmetry of trunk 16, which contains both the axis A' and the cross-sectional view reference line 2—2 seen in FIG. 1. The cross-sectional view of FIG. 2 is a view through a cutaway along first plane A. A second plane E is the plane containing the edges of aperture 70 at the lowermost end of channel 40. A third plane F is the plane containing foot lower surface 24. A fourth plane G is the plane containing the upper surface of mounting block 12. Lastly, a wing bisecting plane H bisects wing 20 by bisecting angle beta. A corresponding parallel wing bisecting plane bisects wing 22 by bisecting the corresponding angle on wing 22.

As seen in FIGS. 9–13, blade 10 is mounted to an actuating linkage 10 whereby the blade may be lowered into the soil 78 or elevated out of contact with soil 78.

Actuating linkage 110 is a parallelogram linkage for displacement in direction I of header box 112 relative to hanger brackets 114. Header box 112 is pivoted relative to hanger brackets 114 on pivotally mounted upper drag arm 116 and lower drag arms 118. Each opposite end of the upper and lower drag arms are pivotally mounted by means of pins, bolts or the like. Thus upper drag arm 116 is mounted at one end between opposite halves 114a and 114b of hanger brackets 114 by means of pin 120. The opposite end of upper drag arm 116 is mounted between the upper curved forks of header box 112 by means of pin 122.

Lower drag arms 118 include an opposed pair of parallel rigid arms 118a and 118b each pinned at the corresponding lower ends of hanger brackets 114 by means of a pair of pins 124. As better seen in FIG. 11, arms 118a and 118b of lower drag arm 118 are rigidly coupled to each other by back plate 126. The opposite end of lower drag arm 118 is pivotally mounted to header box 112 by means of bolts 128.

Scalloped coulter wheel 130 is rotatably mounted on mounting fork 132 by means of mounting plate 133. Depth wheel 134, mounted on one side of coulter wheel 130, controls the depth of the blade in soil 78.

Mounting fork 132 is free to swivel in direction J on shaft 136. Shaft 136 is rotatably mounted in collar 138 on leading end 112c of header box 112.

The parallelogram linkage of upper drag arm 116 and lower drag arms 118 and header box 112 are actuated so as to rotate in direction I about hanger brackets 114 by, in one embodiment, selective actuation of hydraulic ram 138. Hydraulic ram 138 is fed by high pressure hydraulic line 140. The upper end of hydraulic ram 138 is rigidly mounted to hanger brackets 114. The lower end of hydraulic ram 138 is pivotally mounted to spacer block 142 by means of pinned coupling 144. Spacer block 142 is rigidly mounted between lower drag arm members 118a and 118b. Extension of hydraulic ram 138 causes rotation of the upper and lower drag arms downwardly about pins 120 and 124 on hanger brackets 114. Retracting hydraulic ram 138 rotates the upper and lower drag arms upwardly. Thus with blade 10 mounted by means of mounting block 12 to header box 112 between fork arms 112a and 112b by, for example, means of bolted bracket 146, the lower end of blade 10 may be selectively depressed below the surface of soil 78 so that blade 10 follows the ground breaking engagement of coulter wheel 130 with the soil.

Figure 14:
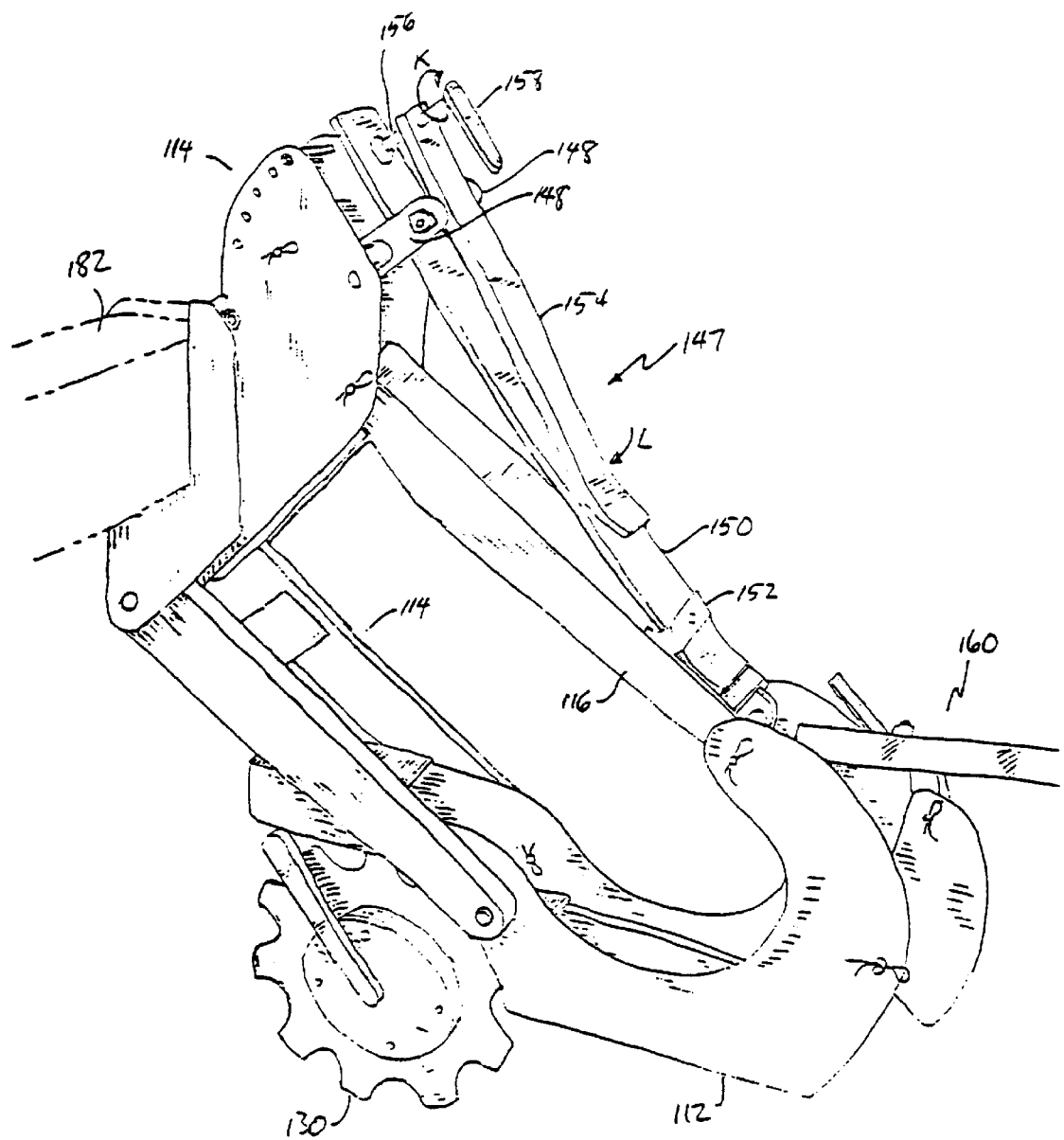
FIG. 14 is an alternative embodiment of the actuating linkage of the present invention.

In an alternative embodiment seen in FIG. 14, hydraulic ram 138 is replaced with leaf spring assembly 147. An upper forward end of leaf spring assembly 147 is mounted between hanger brackets 114 by means of mounting brackets 148. A lower rearward end of main spring 150 is rigidly mounted, for example, by means of bracket 152 to upper drag arm 116. Preferably, a secondary leaf spring 154 is pivotally mounted to upper ends of mounting brackets 148 so that tightening in direction K of threaded shaft 156 by rotation of handle 158 forces the lower rearward end of secondary leaf spring 154 downwardly in direction L against the upper surface of mainspring 150. This applies the downward pressure also in direction L against the parallelogram linkage of upper drag arm 116 and lower drag arm 118 so as to press blade 10 (not shown in FIG. 14) into engagement with the soil. The magnitude of the downward pressure applied by leaf spring assembly 146 onto blade 10 is adjusted by tightening or loosening threaded shaft 156 against main spring 150.

Figure 10:
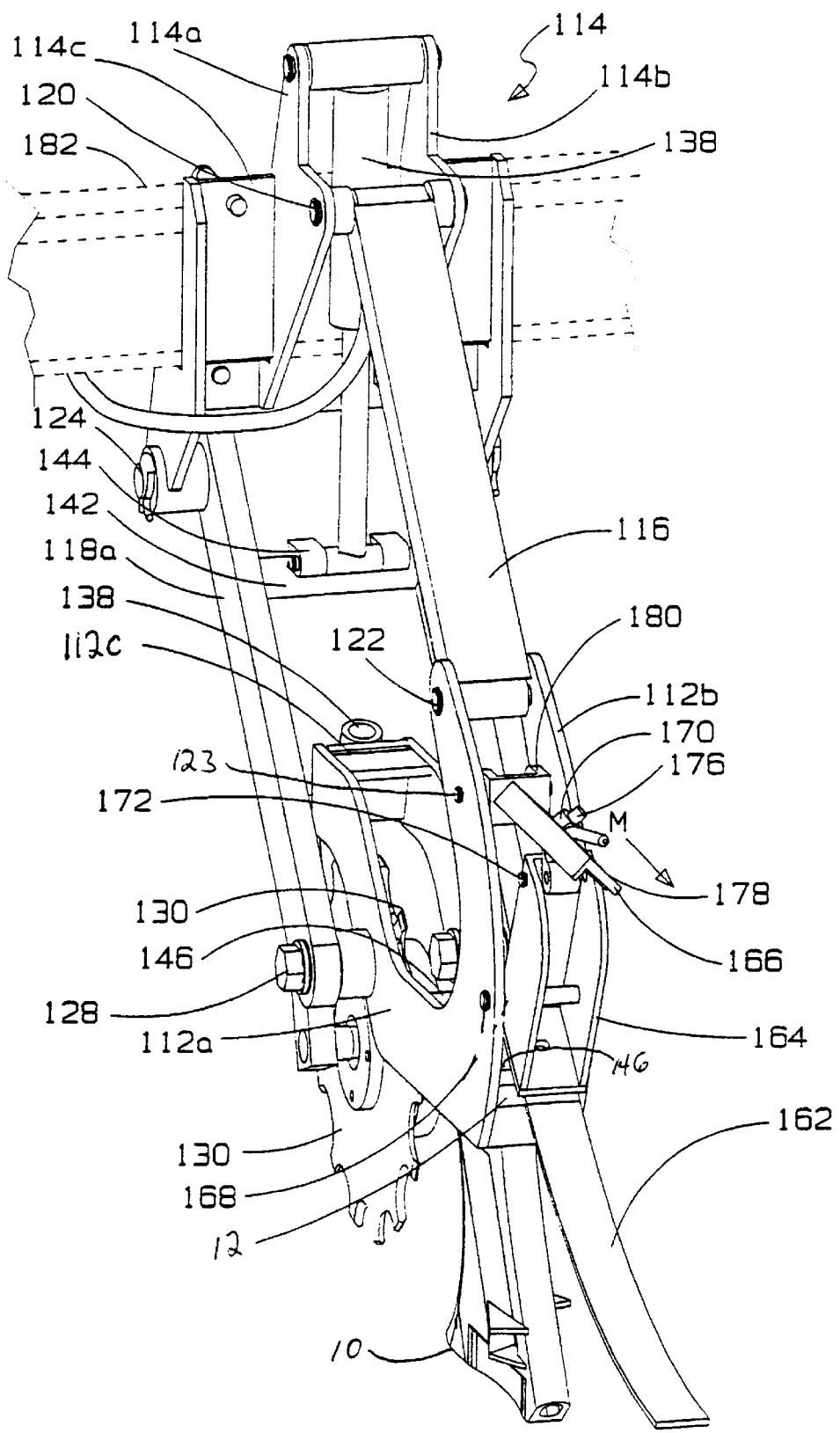
FIG. 10 is, in a rear perspective view, the actuating linkage of FIG. 9.

As blade 10 is dragged in direction B through soil 78 a furrow 80 is created as described above. In one embodiment of the present system, a closure assembly 160 is mounted between fork arms 112a and 112b on header box 112. Closure spring arm 162 is pivotally mounted at its upper forward end between fork arms 112a and 112b. The lower rearward end of closure spring arm 162 is free to hand down into engagement with the upper surface of furrow 80 formed behind blade 10 as blade 10 passes through soil 78. Downwards pressure is applied to closure spring arm 162 by means of rocker arm 164 and ratchet arm 166. Rocker arm 164 is pivotally mounted between fork arms 112a and 112b by means of pinned shaft 168. A releasable lock 170 is pivotally mounted to the upper end of rocker arm 164 by means of pin 172. Releasable lock 170 may be loosened, for example by means of a nut and bolt coupling so that lock 170 may be selectively slid along ratchet teeth 174 and lock 170 resecured once the upper end of rocker arm 164 has been slid to a desired position outwardly along ratchet arm 166. As seen in FIG. 10, the upper end of releasable lock 170 may be a threaded shaft or bolt 176 protruding upwardly through a slot 178 which extends substantially the length of ratchet arm 166. Ratchet arm 166 is pivotally mounted to the upper ends of fork arms 112a and 112b by means of pin 113. In particular, the base end of ratchet arm 166 is rigidly mounted to a base coupling bracket 180, and it is base coupling bracket 180 which is pinned by pin 123 between the fork arms.

Selectively positioning the upper end of rocker arm 164 outwardly in direction M along ratchet arm 166 rotates rocker arm 164 downwardly relative to header box 112 about pinned shaft 168 so as to apply a downward pressure against the upper surface of closure spring arm 162. This applies a greater downward pressure to the lowermost rearward end of closure spring arm 162 which in turn applies a greater pressure in closing furrow 80.

Figure 11:
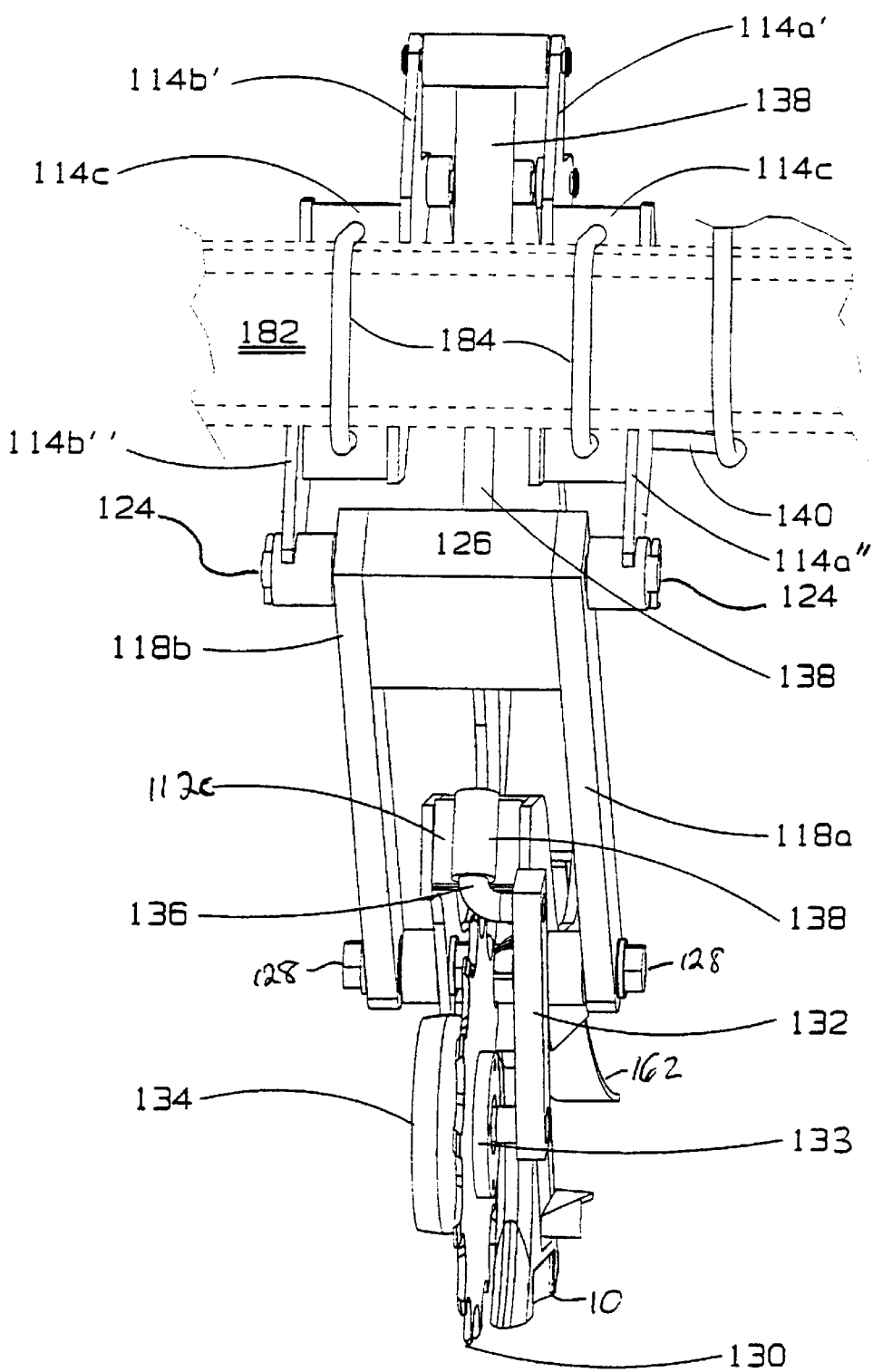
FIG. 11 is, in a front perspective view, the actuating linkage of FIG. 9.
Figure 12:
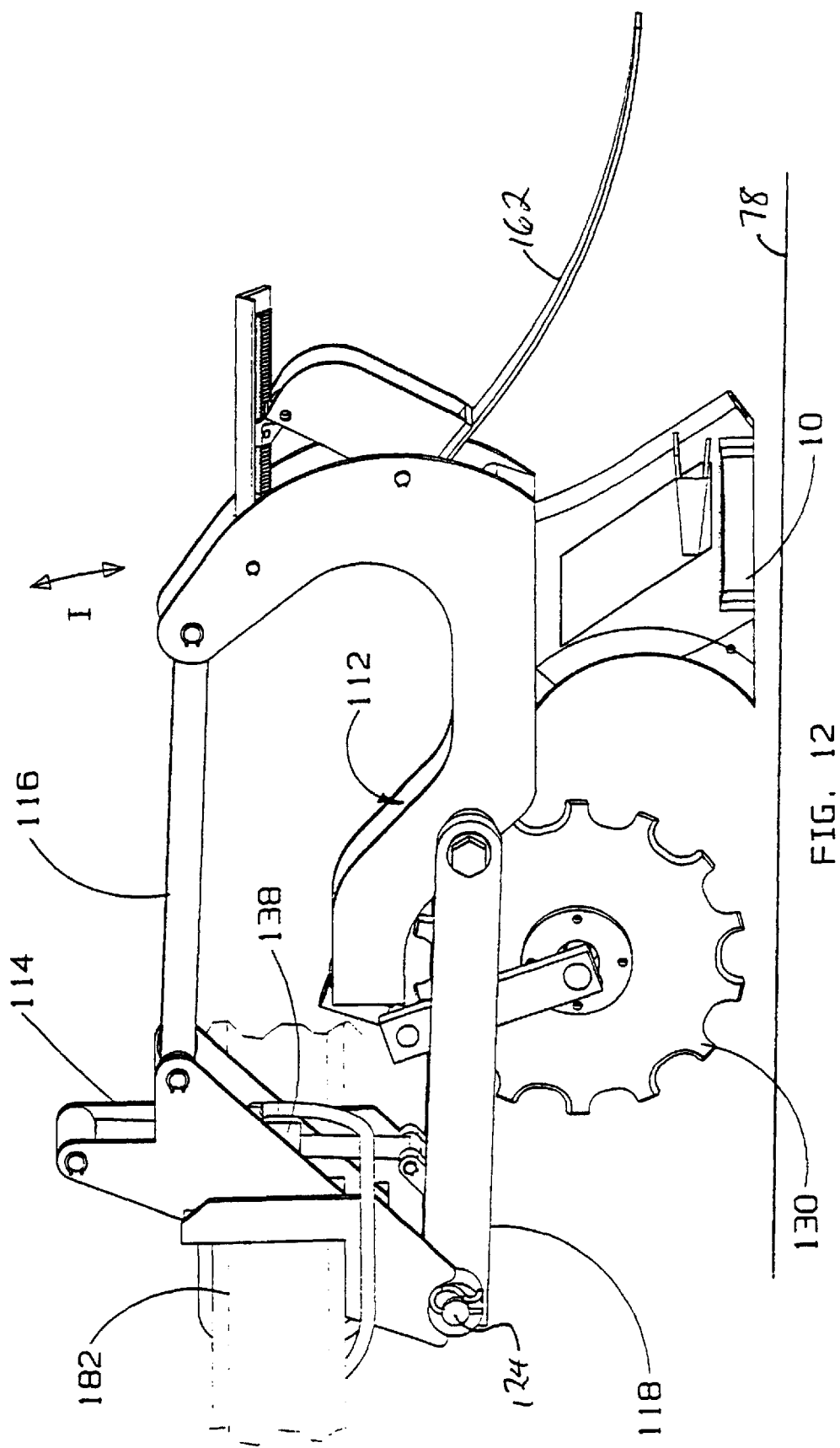
FIG. 12 is the view of FIG. 9, with the actuating linkage elevated.
Figure 13:
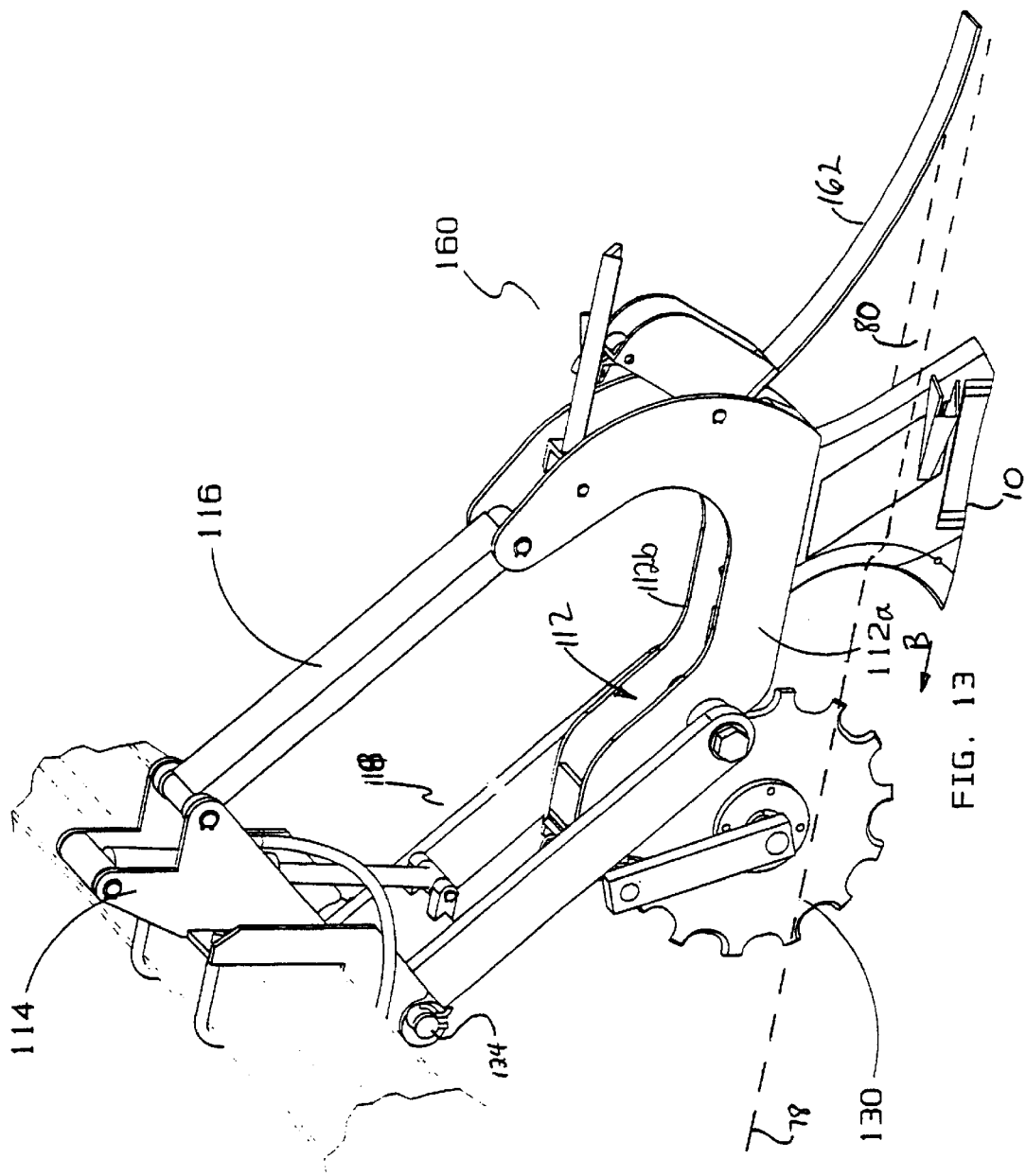
FIG. 13 is the linkage of FIG. 12 showing the coulter wheel and blade lowered into the soil.

As better seen in FIG. 11, each of the two mirror image components 114a and 114b making up hanger brackets 114 are in fact each a parallel assembly of two plates. Thus, for example, with respect to component 114a, it is made up of an inner plate 114a' and an outer parallel plate 114a". Similarly, component 114b is made up of an inner plate 114b' and a parallel outer plate 114b". The inner and outer plates are rigidly spaced apart by means of identical spacer blocks 114c rigidly mounted between the inner and outer plates. Spacer blocks 114c provide rigid mounting surfaces so that hanger brackets 114 may be rigidly mounted to, for example, bar 182, shown in dotted outline, by u-shaped brackets 184.

In the preferred embodiment, bar 182 extends laterally across a supporting frame structure so that a laterally spaced apart array of actuating linkages 110 may be mounted across bar 182. Thus, in the preferred embodiment, the supporting frame structure supporting bar 182 is preferably mounted on wheels so that the entire structure may be towed or mounted to a tractor or the like thereby simultaneously pulling a laterally spaced apart array of blades 10 through soil 78.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An in-line sub-surface seeding, fertilizing and watering device comprising an in-line blade mounted to a header member of a parallelogram linkage so as to be vertically downwardly disposed generally in a plane containing said linkage, said blade having internal conduits for transporting seed, fertilizer or water from an upper infeed to openings at a lower end of said blade, said parallelogram linkage comprising a pair of parallel rigid drag arms extending between said header member and a hanger member, said arms pinned at their respective ends to said header and hanger members so that rotation of said header member relative to said hanger member on said parallel arms maintains a generally horizontal orientation of said header member thereby supporting said blade, when mounted in said header member, downwardly in a constant orientation, wherein said hanger member is mountable to a supporting frame, said device further comprising selective actuation means for selective control of a downward force urging said blade, when on said header member, downwardly into soil.

2. The device of claim 1 wherein said selective actuation means is a hydraulic actuator mounted between said hanger member and said drag arms, whereby said blade may also be selectively elevated so as to remove said blade from the soil.

3. The device of claim 1 wherein said selective actuation means is a hydraulic actuator mounted between said frame and said header member, whereby said blade may also be selectively elevated so as to remove said blade from the soil.

4. The device of claim 1 wherein said selective actuation means is a hydraulic actuator mounted between said hanger member and said header member, whereby said blade may also be selectively elevated so as to remove said blade from the soil.

5. The device of claim 1 wherein said selective actuation means is a hydraulic actuator mounted between said frame and said drag arms, whereby said blade man also be selectively elevated so as to remove said blade from the soil.

6. The device of claim 1 further comprising a coulter wheel mounted to a forward end of said header member ahead of a leading edge of said blade when said blade is mounted to said header member behind an intermediate position along said header member.

7. The device of claim 1 further comprising a furrow closure assembly mounted to a rear end of said header member so as to trail rearwardly therefrom in line with a furrow created by said blade passing through the soil.

8. The device of claim 7 wherein said closing arm is urged downwardly by a selectively adjustable downward biasing means mounted to a rear end of the header member.

9. The device of claim 8 wherein said downward biasing means is a rocker arm pivotally mounted to said header member and selectively adjustable so as to be rotated downwardly into downward biasing engagement against said furrow closing arm.

10. The device of claim 7 wherein said furrow closure assembly is a leaf spring.

11. An in-line, sub-surface seeding, fertilizing and watering device comprising:

an opening blade, said opening blade having first and second sides extending between a leading edge and an aft edge, said first and second sides generally symmetrical to each other on either side of a first plane, said first plane generally bisecting said opening blade, said leading edge and said aft edge lying generally in said first plane, said opening blade for generally vertically disposed partial submerging into soil to a first submerged depth during forward translation advancing said leading edge through the soil, said opening blade having an upper surface and a lower surface extending between upper and lower edges respectively of said first and second sides, first and second wings mounted to said first and second sides respectively in generally oppositely disposed relation so as to be cantilevered outwardly therefrom, said first and second wings extending between first and second forward wing edges and first and second aft-opening wing apertures in said first and second wings respectively, said first and second wings mounted to said first and second sides at, respectively, first and second distances from said lower surface measured generally parallel to said first plane, said opening blade having therethrough, and generally lying in said first plane, first and second conduits, said first and second conduits extending from, and cooperating with, at uppermost ends thereof, first and second infeed ports in said upper surface, said first and second conduits cooperating with, at lowermost ends thereof, first and second wing ducts extending aft through said first and second wings respectively between said lowermost ends of said first and second conduits and said first and second aft openings wing apertures, said first and second conduits and corresponding said first and second wing ducts thereby in material flow communication between said first and second infeed ports and corresponding said first and second aft opening wing apertures for seed, fertilizer or fluid flow, as fed from a material feeder, therethrough during said forward translation, wherein said first and second distances are less than said first submerged depth so that said first and second wings are submerged in the soil during said forward translation, said device further comprising a parallelogram linkage comprising a pair of parallel rigid drag arms extending between a header member and a hanger member, said blade mountable into said header member so as to be generally vertically downwardly disposed, said arms pinned at their respective ends to said header and hanger members so that rotation of said header member relative to said hanger member on said parallel arms maintains a generally horizontal orientation of said header member thereby supporting said blade, when mounted in said header member, downwardly in a constant orientation, wherein said hanger member is mountable to a supporting frame, said header member cooperating in fluid communication with said material feeder for feeding material to said first and second infeed ports on said blade, said device further comprising selective actuation means for selective control of a downward force urging said blade downwardly into soil to said first submerged depth.

12. The device of claim 11 wherein said selective actuation means is a hydraulic actuator mounted between said hanger member and said drag arms, whereby said blade may also be selectively elevated so as to remove said blade from the soil.

13. The device of claim 11 wherein said selective actuation means is a hydraulic actuator mounted between said frame and said header member, whereby said blade may also be selectively elevated so as to remove said blade from the soil.

14. The device of claim 11 wherein said selective actuation means is a hydraulic actuator mounted between said hanger member and said header member, whereby said blade may also be selectively elevated so as to remove said blade from the soil.

15. The device of claim 11 wherein said selective actuation means is a hydraulic actuator mounted between said frame and said drag arms, whereby said blade may also be selectively elevated so as to remove said blade from the soil.

16. The device of claim 11 further comprising a coulter wheel mounted to a forward end of said header member ahead of a leading edge of said blade when said blade is mounted to said header member behind an intermediate position along said header member.

17. The device of claim 11 further comprising a furrow closure assembly mounted to a rear end of said header so as to trail rearwardly therefrom in line with a furrow created by said blade passing through the soil.

18. The device of claim 17 wherein said closure assembly is urged downwardly by a selectively adjustable downward biasing means mounted to a rear end of the header member.

19. The device of claim 18 wherein said downward biasing means is a rocker arm pivotally mounted to said header member and selectively adjustable so as to be rotated downwardly into downward biasing engagement against said furrow closure assembly.

20. The device of claim 17 wherein said furrow closure assembly is a leaf spring.

21. The device of claim 1 wherein said header member is a header box for mounting therein of a base of said blade.

22. The device of claim 21 wherein said header box includes oppositely disposed side fork members extending upwardly from said base of said blade when mounted in said header box said drag arms including an upper arm pivotally mounted at a forward end to said hanger member, at an opposite rearward end to an upper end of said side folk members.

23. The device of claim 22 wherein said drag arms include a lower arm pivotally mounted at a forward end thereof to said hanger member and at an opposite rearward end thereof to a forward end of said header box.

24. The device of claim 11 wherein said header member is a header box for mounting therein of a base of said blade.

* * * * *